US009262933B2

(12) United States Patent
Hoy

(10) Patent No.: US 9,262,933 B2
(45) Date of Patent: Feb. 16, 2016

(54) LATERAL AVOIDANCE MANEUVER SOLVER

(75) Inventor: Patrick Donald Hoy, Saint Louis, MO (US)

(73) Assignee: The Boeing Company, Chicago, IL (US)

(*) Notice: Subject to any disclaimer, the term of this patent is extended or adjusted under 35 U.S.C. 154(b) by 1572 days.

(21) Appl. No.: 12/617,822

(22) Filed: Nov. 13, 2009

(65) Prior Publication Data

US 2011/0118980 A1  May 19, 2011

(51) Int. Cl.
*G05D 1/00* (2006.01)
*G06F 17/00* (2006.01)
*G06G 7/78* (2006.01)
*G08G 5/04* (2006.01)
*G05D 1/02* (2006.01)
*G08G 5/00* (2006.01)

(52) U.S. Cl.
CPC .............. G08G 5/045 (2013.01); G05D 1/0202 (2013.01); *G08G 5/0008* (2013.01); *G08G 5/0013* (2013.01); *G08G 5/0078* (2013.01)

(58) Field of Classification Search
CPC ... G08G 5/045; G08G 5/0008; G08G 5/0013; G08G 5/0078; G05D 1/0202
USPC .......... 701/301, 302, 411, 414, 415; 340/961
See application file for complete search history.

(56) References Cited

U.S. PATENT DOCUMENTS

| 5,058,024 A * | 10/1991 | Inselberg ....................... 701/301 |
| 5,173,861 A * | 12/1992 | Inselberg et al. ............. 701/301 |
| 5,555,175 A * | 9/1996 | D'orso ............................. 701/5 |
| 6,173,219 B1 * | 1/2001 | Deker ............................... 701/3 |
| 6,405,124 B1 * | 6/2002 | Hutton ......................... 701/467 |
| 6,546,338 B2 | 4/2003 | Sainthuile et al. |
| 6,571,176 B1 * | 5/2003 | Shinmura et al. ............. 701/301 |
| 6,804,607 B1 | 10/2004 | Wood |
| 6,819,982 B2 | 11/2004 | Doane |

(Continued)

FOREIGN PATENT DOCUMENTS

EP 1 936 584 A1 6/2008
WO 2009045664 A2 4/2009

OTHER PUBLICATIONS

U.K. Intellectual Property Office, Combined Search and Examination Report, Application No. GB1018034.7, Feb. 24, 2011.

(Continued)

*Primary Examiner* — Marthe Marc-Coleman
(74) *Attorney, Agent, or Firm* — Ostrager Chong Flaherty & Broitman P.C.

(57) ABSTRACT

A system on-board an unmanned aerial vehicle for controlling a lateral maneuver to avoid a loss of separation between the unmanned aerial vehicle and an intruder into its airspace. The system receives as inputs the desired miss distance, desired bank angle, state vectors for the unmanned aerial vehicle, wind, and an intruder, and a target vector; and outputs a lateral route change which will achieve the desired miss distance and return the unmanned aerial vehicle back to path. In one embodiment, the system comprises a computer programmed with software that runs automatically and guides the unmanned aerial vehicle to perform a lateral maneuver that avoids loss of separation. In another embodiment, the software runs automatically and advises a pilot on the ground (who is flying the drone by remote control) that a maneuver is about to happen, which maneuver the pilot can either accept or reject.

27 Claims, 7 Drawing Sheets

(56) References Cited

U.S. PATENT DOCUMENTS

| | | |
|---|---|---|
| 6,960,750 B2 | 11/2005 | Doane |
| 7,389,163 B1 | 6/2008 | Colich |
| 7,788,314 B2 * | 8/2010 | Holt ............................. 709/201 |
| 2003/0014165 A1 | 1/2003 | Baker et al. |
| 2003/0160708 A1 * | 8/2003 | Knoop .......................... 340/958 |
| 2008/0027647 A1 * | 1/2008 | Ansell et al. ................. 701/301 |
| 2008/0103639 A1 | 5/2008 | Troy et al. |
| 2009/0088972 A1 * | 4/2009 | Bushnell ....................... 701/210 |
| 2009/0143951 A1 * | 6/2009 | Takahashi et al. .............. 701/70 |
| 2010/0039310 A1 * | 2/2010 | Smith et al. .................... 342/29 |

OTHER PUBLICATIONS

James Utt et al., "Development of a Sense and Avoid System", American Institute of Aeronautics and Astronautics; Infotech@Aerospace, Sep. 26-29, 2005, Arlington, Virginia; AIAA 2005-7177.

* cited by examiner

LATERAL AVOIDANCE MANEUVER SOLVER

BACKGROUND

This invention generally relates to systems and methods for re-routing an airborne vehicle when a potential loss of separation from another airborne vehicle has been determined.

Loss of separation between aircraft occurs whenever specified separation minima are breached. Minimum separation standards for airspace are specified by Air Traffic Services (ATS) authorities, based on FAA (Federal Aviation Administration) standards.

The problem to be solved is to assure separation for a single aerial vehicle against one other aerial vehicle, where both vehicles are en-route and a potential loss of separation (LOS) has been calculated.

The existing solutions are as follows: (1) human intervention, e.g., a traffic controller predicts a loss of separation and directs the vehicle controller how to prevent it; (2) Traffic Alert-Collision Avoidance System (TCAS), which predicts an unsafe separation and generates either an alert or avoidance instruction to the vehicle controller to change altitude.

In the case of human intervention, neither a traffic controller nor a remote pilot provide an on-board capability to avoid other aircraft, which is important when data links fail. TCAS uses altitude changes instead of a lateral maneuver. Air traffic rules dictate that unmanned systems will follow right-of-way rules that not only prescribe a lateral maneuver, but disallow altitude changes for separation. FAA CFR 91.113 (b) states: "When a rule of this section gives another aircraft the right-of-way, the pilot shall give way to that aircraft and may not pass over, under, or ahead of it unless well clear." Also altitude changes have a weakness for a see and avoid capability when the sensor meets the minimum field of regard requirements set forth in F2411-07, Standard Specification for Design and Performance of an Airborne Sense-and-Avoid System. The required field of regard does make all potential threat aircraft vehicles visible. A simple example would be two aircraft following the same ground track at separate altitudes. Also TCAS does not return the vehicle to its original vector as required by F2411-07, Section 4.3.5.3.

There is a need for a solution that avoids the disadvantages of the foregoing existing solutions.

BRIEF SUMMARY

One aspect of the invention is a software component intended to exist on-board an aircraft, to be integrated in a sense and avoid system, to help enable unmanned drone aerial vehicles to fly in the national airspace. This software component generates an aircraft route that will assure a desired miss distance with another aircraft, by routing behind the other aircraft at the same flight level and returning back to the original vector.

The embodiments disclosed herein use a unique decomposition of the problem that breaks apart a multiple variable constrained optimization problem into a more efficient series of single variable problems. The problem is modeled as a standard zero finding problem and the "false position" method (Regula Falsi method) is used to solve the sub-problems.

The embodiments disclosed herein offer a new capability of creating lateral maneuvers compared to altitude changes. The unique decomposition of the problem should have superior processing times and be better suited for a real-time processing on-board an aircraft.

Furthermore, the embodiments disclosed herein offer a better guarantee about the miss distance. They do not use ground reference turns and instead utilize the wind vector to create inertial referenced turns. That makes it easier for the flight controller to follow the commanded route, or trajectory. [A ground reference turn is executed by varying bank to follow the desired ground track. Depending on the winds and the turn radius, the required bank may be outside the performance of the vehicle, the effect being that the vehicle cannot follow the commanded path and therefore loses the miss distance guarantee, i.e., there could still be a loss of separation.]

The embodiments disclosed herein inhibit unnecessary nuisance maneuvers. The intruder state vector has uncertainty and a forward projection/prediction/extrapolation introduces even more uncertainty. Maneuvering when not necessary is considered a nuisance to remote pilots, it uses fuel unnecessarily, and it causes safety issues when multiple unmanned drones "meander" through the airspace. Unnecessary maneuvers make customers consider the air system unstable, or operating with unpredictable behavior. To inhibit unnecessary maneuvers, the time until maneuver execution is maximized. This allows state information to improve and the path change to be canceled if determined to be unnecessary.

The system disclosed herein receives as inputs the desired miss distance, the desired bank angle, and state vectors for the unmanned aerial vehicle, wind, and an intruder; and outputs a route change which will achieve the desired miss distance and return the unmanned aerial vehicle back to path.

In accordance with one embodiment, an unmanned aerial vehicle has a computer programmed with software that runs automatically and guides the unmanned aerial vehicle to perform a maneuver that avoids a loss of separation. In accordance with another embodiment, the software runs automatically and advises a pilot on the ground (who is flying the drone by remote control) that a maneuver is about to happen, which maneuver the pilot can either accept or reject.

It should be noted that this invention does not replace TCAS but competes with the internal TCAS avoidance maneuver generation. The embodiment disclosed herein is not a system by itself, but is intended to be integrated in a sense and avoid system. TCAS uses altitude changes to provide separation, while the embodiment disclosed herein creates lateral, level flight maneuvers. Also TCAS does not return the vehicle to its original vector (or newly assigned vector), as required by F2411-07.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
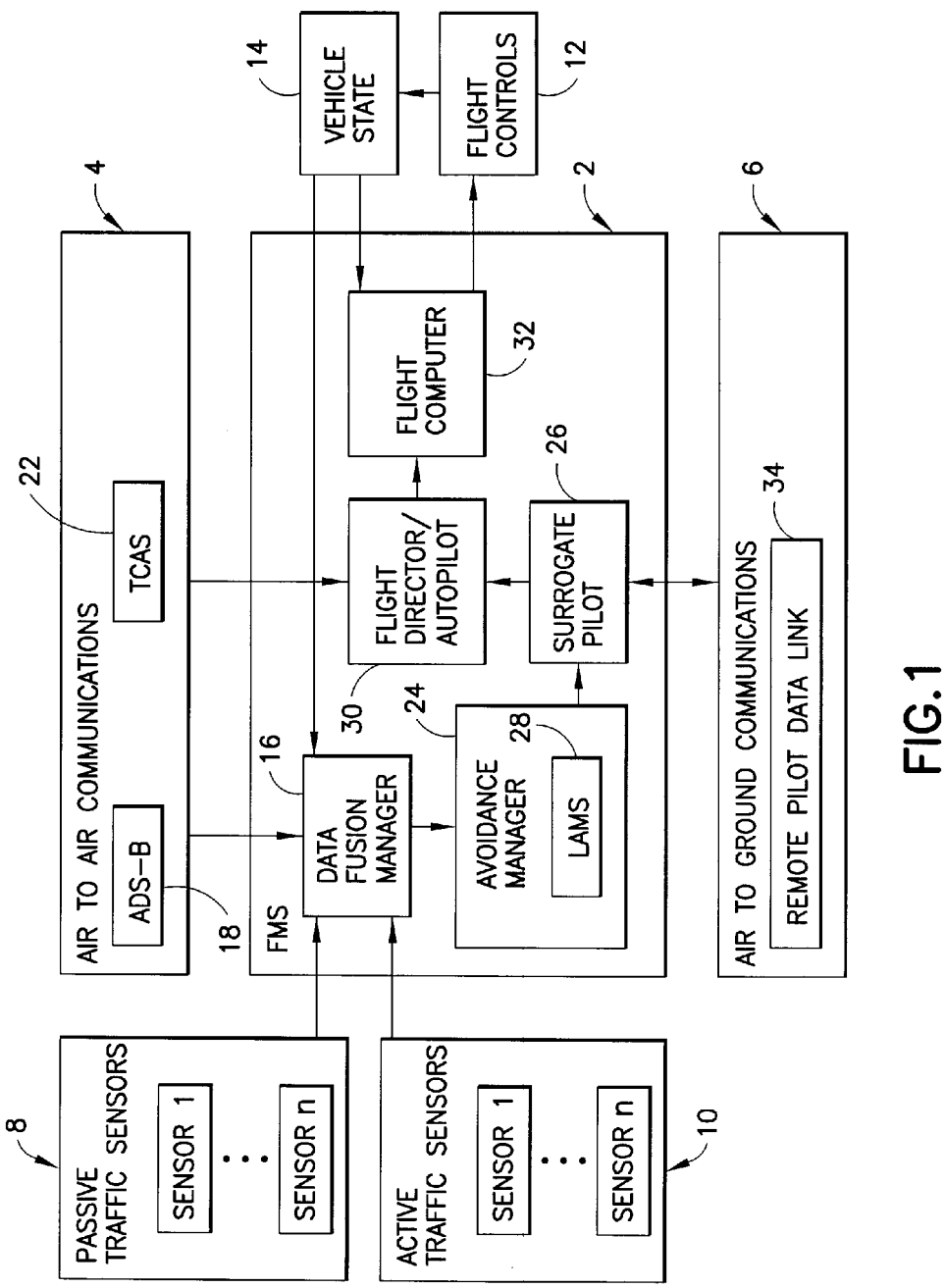
FIG. 1 is a block diagrams showing components of an unmanned air vehicle that incorporates a lateral avoidance maneuver solver (LAMS) of a type disclosed hereinafter

FIG. 1 shows the architecture of a flight management system (FMS) 2 of an unmanned air vehicle incorporating LAMS software. The FMS 2 receives information from air-to-air communications 4, air-to-ground communications 6, passive traffic sensors 8 (e.g., cameras or optical sensors), and active traffic sensors 10 (e.g., radar). The air-to-air communications may include an Automatic Dependent Surveillance-Broadcast (ADS-B) system 18 and a TCAS 22. The FMS 2 also receives information concerning the vehicle state (block 14), such as position and velocity. Based on all of the inputs, the FMS 2 determines what commands should be sent to the flight controls 12 to execute a lateral avoidance maneuver.

The FMS 2 comprises a data fusion manager 16 which receives data signals from the traffic sensors 8, 10, data signals from the air-to-air communications 4, and data signals representing the state of the unmanned vehicle. The task of the data fusion manager 16 is to align the data that belongs to different vehicles, e.g., by outputting a first set of data representing the state of Ownship and a second set of data representing the state of Intruder. The respective data sets are outputted to an avoidance manager 24.

The avoidance manager 24 processes the state data and, when necessary, outputs an avoidance command representing changes in the commanded trajectory to a surrogate pilot 26. The surrogate pilot 26 is the on-board interface for the remote pilot. It converts the remote pilot's messages into inputs into the flight management system. With regard to the avoidance manager 24, the surrogate pilot has two purposes: (1) It relays the state of the avoidance manager 24, e.g., it sends a message that an avoidance maneuver might need to be executed in the near future; (2) The surrogate pilot 26 also acts as a programmable switch based on what level of automation is authorized. If full automation is authorized, the surrogate pilot transfers the avoidance maneuver command from the avoidance manager 24 to the flight director/autopilot 30.

The avoidance manager 24 is a computer programmed with LAMS software 28 that runs automatically. In one mode, the LAMS software 28 generates a command that is passed through the surrogate pilot 26 to the flight director/autopilot 30, which in turn issues instructions to the flight computer 32 to guide the unmanned aerial vehicle to perform a maneuver that avoids loss of separation. In another mode, the LAMS software 28 advises a pilot on the ground (who is flying the drone by remote control) that a maneuver is about to happen, which maneuver the pilot can either accept or reject. This is accomplished by sending the maneuver information first to the surrogate pilot 26 and then to a remote pilot data link 34 of the air-to-ground communications 6. The surrogate pilot 26 then receives the acceptance or rejection from the pilot on the ground (via the same remote pilot data link). If the pilot on the ground has accepted the maneuver, the maneuver information is forwarded to the flight director/autopilot 30 for execution; if the pilot on the ground has rejected the maneuver, the maneuver information is not forwarded.

One embodiment of the LAMS software for providing separation assurance for a single unmanned air vehicle against one other air vehicle, where both vehicles are en route and a potential LOS is calculated between them will now be described.

The solver uses a unique decomposition of the problem that breaks apart a multiple variable constrained optimization problem into a more efficient series of single variable problems. The problem is modeled as a standard zero-finding problem and the "false position" method (Regula Falsi) is used to solve the sub-problems. The Regula Falsi method is disclosed by Bronshtein et al. in Section 19.1.1.3 of The Handbook of Mathematics ($4^{th}$ Edition), Springer-Verlag, the contents of which are incorporated by reference herein.

The following terms are used in this disclosure: Ownship—the vehicle where the process is hosted; the vehicle that is giving the right-of-way; Intruder—a vehicle the Ownship is avoiding; the vehicle that caused the Ownship to change its flight path; Conflict—a predicted loss of separation (LOS) between trajectories of Ownship and Intruder based on a desired miss distance S; Separation region—a circular region having a radius that is one half of the desired miss distance S; CPA (Closest Point of Approach)—the place, distance, and time where the distance between Ownship and Intruder is at its minimum (the CPA occurs after a loss of separation); Resolution—a maneuver that, if followed, will assure the desired miss distance (only heading changes on a level plane are considered in this embodiment); Maneuver Start Time (diverge time)—a resolution is generated so that it will start at a point in the future (a vehicle will not change its current intent (diverge) until it starts to execute the resolution, and that time is the maneuver start time); Unnecessary Maneuver—when Ownship deviates from its path when not required to do so, i.e., staying on course would not have caused a LOS.

The equations disclosed hereinafter use the two-dimensional Cartesian coordinate system, which will be a local tangent plane common to both Ownship and Intruder.

Altitudes are not discussed hereinafter because it is assumed the two trajectories are projected onto a common coordinate system for the period where there is not enough vertical separation. The FAA right-of-way rules include special instructions when a vehicle is descending or ascending, so it is assumed a higher level function in the sense and avoid system will determine if this process should be invoked.

Figure 2:
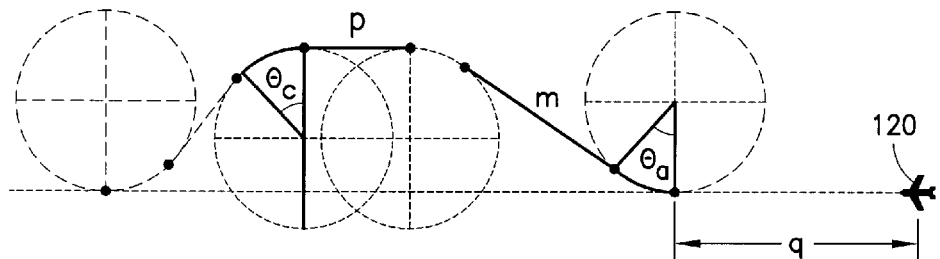
FIG. 2 is a diagram showing the control variables of a lateral maneuver model in accordance with one embodiment of the invention.

Referring to FIG. 2, the lateral maneuver model for an unmanned aerial vehicle 120 is comprised of seven segments connected by eight points. The segments of this model consist of four arcs and three straight legs. Each arc uses the same turn radius, where the radius is found using a desired bank angle and the airspeed of the vehicle. The turn radius is $r=V^2/(g*\tan(\phi))$, where r=turn radius in meters; V=airspeed in m/sec; g=gravity in m/sec$^2$; $\phi$=desired bank angle in radians; and the symbol * represents multiplication.

Six control variables can be used to generate, or define, this lateral maneuver. The control variables for one maneuver are [$\theta_a$, $\theta_c$, m, p, q, d], where $\theta_a$ is the angular value for the first and second turns; $\theta_c$ is the angular value for the third and fourth turns; m is the inertial length of the first leg in meters; p is the inertial length of the second leg in meters; q is the diverge time in seconds from the initial position; $d_{bank}$ is the initial bank direction, left or right.

The first and second turns use the same duration so that the p leg is always parallel to the original path, and consequently the third and forth turns are also the same duration. The last dashed leg in FIG. 2 is a dependent value and is set such that the maneuver intersects the original vector.

The ranges for the control variables are set so that only forward motion occurs. The start time is limited to time of LOS. The remaining limits are configurable. The limits are as follows: $\theta_a$—[0, 90] degrees ground course change; $\theta_c$—[0, 90] degrees ground course change; m—[0, M] meters; p—[0, P] meters; q—[0, L] seconds; $d_{bank}$—either −1 bank left or +1 bank right, where M is the configurable maximum off-path distance; P is the configurable maximum passing distance; and L is the time of loss of separation.

The bank direction $d_{bank}$ can be predetermined and removed as a control variable, which is necessary when adhering to some of the FAA right-of-way rules.

The control variables [$\theta_a$, $\theta_b$, m, p, q, $d_{bank}$] are used to generate the trajectory seen in FIG. 2. This is accomplished using the standard equations of motion and extrapolation listed in the Appendix. The instructions are as follows: Given the control values, initial position P, wind vector $\overline{W}$, inertial speed s, inertial course i, turn radius r (note all angles are in radians but degrees are shown for the reader's convenience; also, each asterisk represents the multiplication operator):

| Calculation | Description |
| --- | --- |
| w = s/r | Find angular velocity |
| x = $x_p$ + q*s*cos(i) + q*$W_x$ | Find first turn start |
| y = $y_p$ + q*s*sin(i) + q*$W_y$ | |
| h = x + r*cos(i − 90°) | Find first turn center |
| k = y + r*sin(i − 90°) | |
| w0 = I + 90° | Find first initial angle |
| t = $\theta_a$/w | Find duration |
| x = h + r*cos(w0 − w*t) + t*$W_x$ | Find first turn end |
| y = k + r*sin(w0 − w*t) + t*$W_y$ | |
| i = i + w*t | New inertial course |
| x = $x_p$ + m*s*cos(i) + q*$W_x$ | Find second turn start |
| y = $y_p$ + m*s*sin(i) + q*$W_y$ | |
| h = x + r*cos(i + 90°) | Find second turn center |
| k = y + r*sin(i + 90°) | |
| w0 = I − 90° | Find second initial angle |
| x = h + r*cos(w0 + w*t) + t*$W_x$ | Find second turn end |
| y = k + r*sin(w0 + w*t) + t*$W_y$ | |
| i = i + w*t | New inertial course |
| x = $x_p$ + p*s*cos(i) + q*$W_x$ | Find third turn start |
| y = $y_p$ + p*s*sin(i) + q*$W_y$ | |
| t = $\theta_c$/w | Find duration |
| h = x + r*cos(i + 90°) | Find third turn center |
| k = y + r*sin(i + 90°) | |
| w0 = I − 90° | Find third initial angle |
| x = h + r*cos(w0 + w*t) + t*$W_x$ | Find third turn end |
| y = k + r*sin(w0 + w*t) + t*$W_y$ | |
| i = i + w*t | New inertial course |
| f = intercept( ) | Find f for intercept |
| x = $x_p$ + f*s*cos(i) + q*$W_x$ | Find fourth turn start |
| y = $y_p$ + f*s*sin(i) + q*$W_y$ | |
| h = x + r*cos(i − 90°) | Find fourth turn center |
| k = y + r*sin(i − 90°) | |
| w0 = i + 90° | Find fourth initial angle |
| x = h + r*cos(w0 − w*t) + t*$W_x$ | Find fourth turn end |
| y = k + r*sin(w0 − w*t) + t*$W_y$ | |
| i = i + w*t | Back to original inertial course. Complete |

The sign differences correspond to first turning right, turning left twice, and turning right again.

The duration of the third leg is dependent upon the exit position of the third turn. The duration is set so that the end of the maneuver is back on the original vector. The intercept is calculated as described in the Appendix in the section entitled "Intercepting a Target Vector in a Wind." The Appendix describes that, when using a given value of $\theta_c$, there may not be enough room to make both the third and fourth turns. The end of the fourth turn can "overshoot" the target vector. In this case, the method "Finding an Intercept with a Parallel Vector" (also in the Appendix) is used to find the intercept.

The LAMS software also calculates the time of the closest point of approach (CPA) for two vectors using the following equation:

$$t = \frac{(x1-x2)(vx2-vx1)+(y1-y2)(vy2-vy1)}{(vx2-vx1)(vx2-vx1)+(vy2-vy1)(vy2-vy1)}$$

where x1 is the initial x position of Ownship; y1 is the initial y position of Ownship; vx1 is the initial x velocity of Ownship; vy1 is the initial y velocity of Ownship; x2 is the initial x position of Intruder; y2 is the initial y position of Intruder; vx2 is the initial x velocity of Intruder; and vy2 is the initial y velocity of Intruder.

The time t of the CPA will be negative if the CPA was in the past and the objects are gaining separation. In this case, the distance at the initial position is the CPA. For finite time vectors, the time t can occur after one of the vector's duration. In this case, the shortest duration is used to find the time of CPA. Otherwise time t is used to define the time of CPA.

For each search frame, the positions of Ownship and Intruder are extrapolated to the CPA, and then the distance is calculated. This calculated distance is the closest distance that will occur between the two moving objects. If the distance is less than the separation distance S, there is a LOS.

When computing the CPA for a series of turns and legs, the procedure above is repeated and the minimum distance is found. A search time frame is used when doing this, so the search moves to the frame's start time before calculating and does not calculate past the frame's end time.

To calculate the CPA of the maneuver against an intruder, the lateral maneuver is used to create a series of linear approximations through the turns. Equations (3)-(10) in the Appendix are used to step through the turns, and the successive points and the step time is used to create a ground vector, where the step time is the duration. The approximation error is directly proportional to the step size. The error is r*[1−cos ($\theta$/2)], where r is the radius, and $\theta$ is the step angular value. The corresponding ground frame error can increase with winds.

This sequence of ground vectors is used to find the minimum distance between the lateral maneuver and the intruder's ground vector as previously described.

The solver disclosed herein uses a unique decomposition of the problem that breaks apart a multiple variable constrained optimization problem into a more efficient series of single variable problems. The problem is modeled as a standard zero/root-finding problem and the false position is used to solve the sub-problems. The false position method always converges if the problem is bounded, so the problem decomposition was designed to create bounds for the searches. In this context, "bounded" means that for a single variable function f(x) and two initial values for x, x0 and x1, that f(x0) and f(x1) are of opposite polarity (there has to be a zero between them). The function in this process is the minimum CPA minus the desired miss distance S. This function is zero when they are equal, positive if there is extra separation, and negative if there is a LOS.

The solver simplifies the problem by setting $\theta_c$ equal to $\theta_a$, and also only uses an initial right turn, thereby reducing the number of control variables to four ($\theta_a$, m, p, q). As can be readily seen, either $\theta_a$ or m is needed, not both, so there are only three false position searches performed to find the complete maneuver. There is a test where the first and second turns are set to 90°, and the first leg is set to minimum (0 meters). The test will find that either there is still a LOS or there is not. If there is not a LOS, then there is no reason to extend the first leg; it would just cause extra separation. So the first leg remains at minimum. In this case, we want to reduce the turns to reduce the distance traveled. If there is a conflict, the turns are at maximum and will stay at maximum; so no search for $\theta_a$ is needed. But to achieve separation, the first leg needs to be increased. So a search for m is performed.

Figure 3:
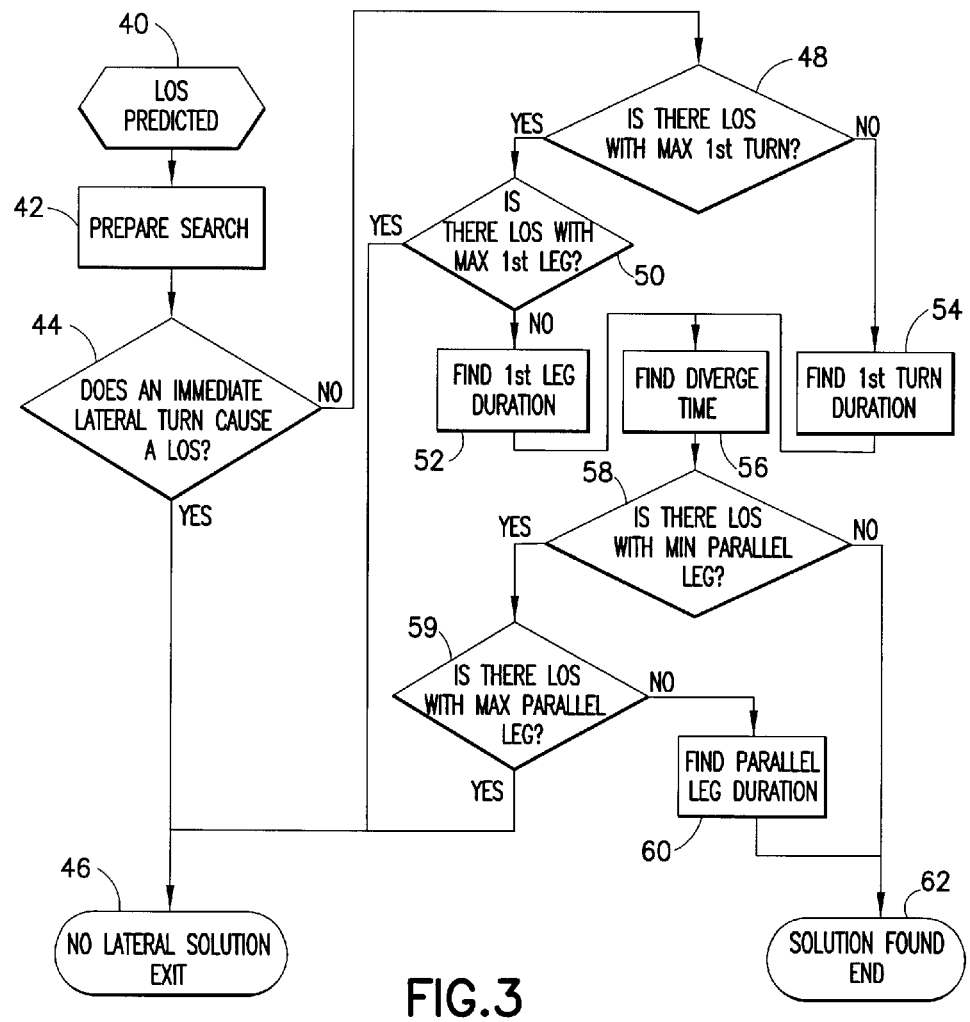
FIG. 3 is a process flow diagram showing a search flow entailing three false position searches performed by the lateral avoidance maneuver solver disclosed herein.

The search flow diagram is shown in FIG. 3, in which rectangles 52, 54, 56 and 60 each represent a false position search. In general, the complete search is intended to bring the three parts of the maneuver (first set of turns, parallel leg, and last set of turns) into the encounter.

If the distance is less than the separation distance S, a LOS is predicted in step 40. In the next step 42, the search is prepared. Preparation for the search begins by setting the variables as follows:

| $\theta_a$ | $\theta_c$ | m | P | Q |
|---|---|---|---|---|
| Max | max | min | Max | Min |

In this case, $q_{min}=0$ and $\theta_{a,max}=90$ degrees. This creates a maneuver that starts immediately, and makes the maximum first turn. It also extends the parallel leg.

It is possible that no lateral solution exists if the conflict is too imminent. To determine if this condition occurred, the miss distance is tested from the beginning of the first turn only through the second turn in step 44. If there is a LOS, the procedure exits in step 46. The belief is that a higher level function in the sense and avoid system will use the exit condition to invoke search functions that look at altitude or speed resolutions, which are outside the scope of this procedure and also outside of the right-of-way rules maneuvers. Otherwise the procedure continues.

The first search will either be for the first turn duration $\theta_a$ (step 54 in FIG. 3) or the first leg duration m (step 52 in FIG. 3). The choice of variable is determined by testing for a LOS through the extended parallel leg in step 48. If the maximum first turn duration $\theta_a$ (with minimum first leg duration) causes a LOS (step 48) and also if the maximum first leg duration does not cause a LOS (step 50), then the first leg needs to be extended (step 52). If the maximum first turn duration $\theta_a$ and minimum first leg duration do not cause a LOS, then the maximum first and second turns are more than sufficient and need to be reduced in duration (step 54).

The variable that is not searched retains its current value, which is maximum for $\theta_a$ or minimum for m. Regardless of the variable, the search duration ends at the end time of the parallel leg. The false position method is used to find the value which causes the CPA to equal the desired miss distance. The false position method bounding values are the minimum and maximum of the selected variable.

For the first turn duration search (step 54 in FIG. 3), the initial values are minimum and maximum. With the turn set to zero (minimum), the maneuver collapses and the path is simply the original path. Since the original path had a LOS, a zero turn will have a conflict and the f(0) will be negative. If we are searching for the first turn duration, it is true that the maximum turn was too much, i.e., it removed the LOS and the f(max) is positive. So the function is bounded.

Figure 4:
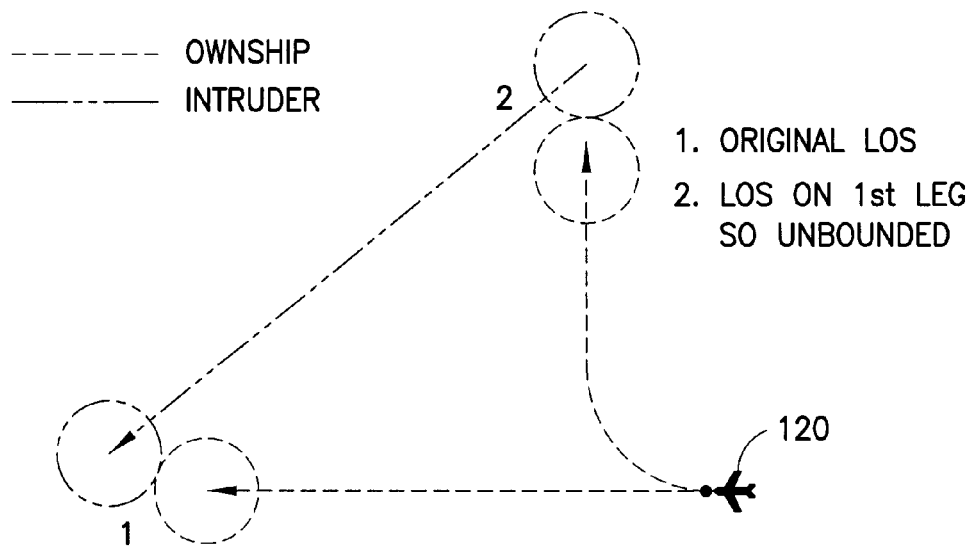
FIG. 4 is a diagram showing a potential case where the maximum duration of the first leg of the lateral avoidance maneuver has a LOS, i.e., there is no lateral resolution.

If the first leg duration needs to be found (step 52 in FIG. 3), the initial values are minimum and maximum. If we are searching for this value, it is true that the minimum leg was not enough, i.e., there is still a LOS and the f(min) is negative. FIG. 4 shows a potential case where a loss of separation has been predicted at encounter 1, but the maximum duration of the first leg also causes the unmanned aerial vehicle 120 (i.e., Ownship) to have a LOS at encounter 2. The search frame for the test goes through the parallel leg. If there is a LOS (step 50 in FIG. 3), the function is unbounded and the process exits (step 46) because there is no lateral solution, given the initial right turn and 90-degree maximum turn constraints. If the f(max) is positive, the function is bounded and the leg duration will be found in step 52.

Figure 5A:
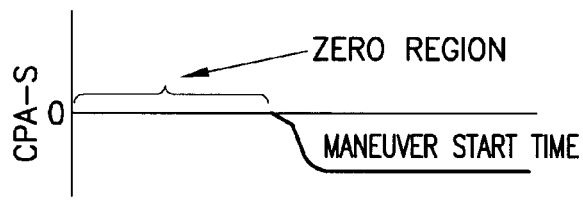
FIG. 5A is a conceptual graph showing the function of diverge time when the parallel leg is included in the closest point of approach (CPA) calculation.
Figure 5B:
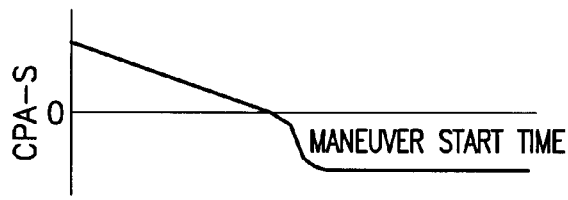
FIG. 5B is a conceptual graph showing the function of diverge time when the parallel leg is not included in the closest point of approach (CPA) calculation.

The second search (step 56 in FIG. 3) is for the maneuver start or diverge time q. This visually pushes the first half of the maneuver into the encounter, which maximizes the time until the maneuver needs to be executed. The same false position method is used, but the trick is setting the search frame. The search frame starts at the current time. The end of the search frame is only through the end time of the second turn, instead of the end of the parallel leg. The CPA of the parallel leg, because of the first search, is already equal to the miss distance. If this leg was included in the CPA calculation, the function would have a large zero region which would mask the search as shown in the conceptual graph in FIG. 5A. The zero area would cause the false-position search to find an arbitrary value for the diverge time. The desired function is shown in FIG. 5B and is achieved by excluding the parallel leg from the CPA calculation.

When search for the diverge time is performed, the problem is already conflict free, and the search is intended to maximize the start time. The earlier search used the minimum start time, and because there is no LOS, then f(min) is positive. The maximum start time is the original LOS, which causes a LOS because the turn starts at the same point as the conflict occurs. So f(max) is negative, and the problem is bounded.

The third search is for the duration of the parallel leg. This visually pulls the last part of the maneuver into the encounter, which minimizes the time away from the original path. The same false position method is used, but again the trick is setting the search frame. The search frame starts at the beginning of the third turn, instead of the beginning of the maneuver or current position. As previously discussed, the CPA of the parallel leg is already equal to the miss distance. If this leg was included in the CPA calculation, the function would have a large zero region which would mask the search as shown in the conceptual graph in FIG. 5A. The end of the search frame should be a reasonably large time in the future.

Figure 6:
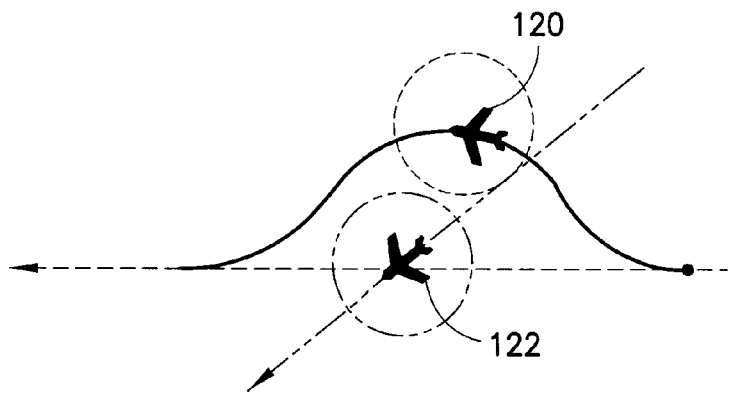
FIG. 6 is a diagram showing a potential case where a parallel leg of minimum duration (i.e., no parallel leg) does not result in a LOS.

Next, a determination is made whether the minimum parallel leg causes a LOS (step 58 in FIG. 3). If the minimum parallel leg does not cause a LOS, the problem is already solved and the final search can be bypassed. FIG. 6 shows this case; the turns by themselves provide a resolution whereby Ownship 120 avoids Intruder 122. In this case, the problem is unbounded, but the resolution is conflict free so the process simply ends successfully at step 62. In reality the parallel leg is normally only useful for "passing," and often is not used.

The parallel leg is intended for passing, and the maximum value needs to resolve the LOS for the function to be bounded. So step 59 in FIG. 3 tests the maximum value of the parallel leg. If f(max) is also negative, the function is unbounded and the procedure exits in step 46. Otherwise the function is bounded and the duration of the parallel leg will be found in step 60 in FIG. 3. The process then ends successfully at step 62.

Figure 7:
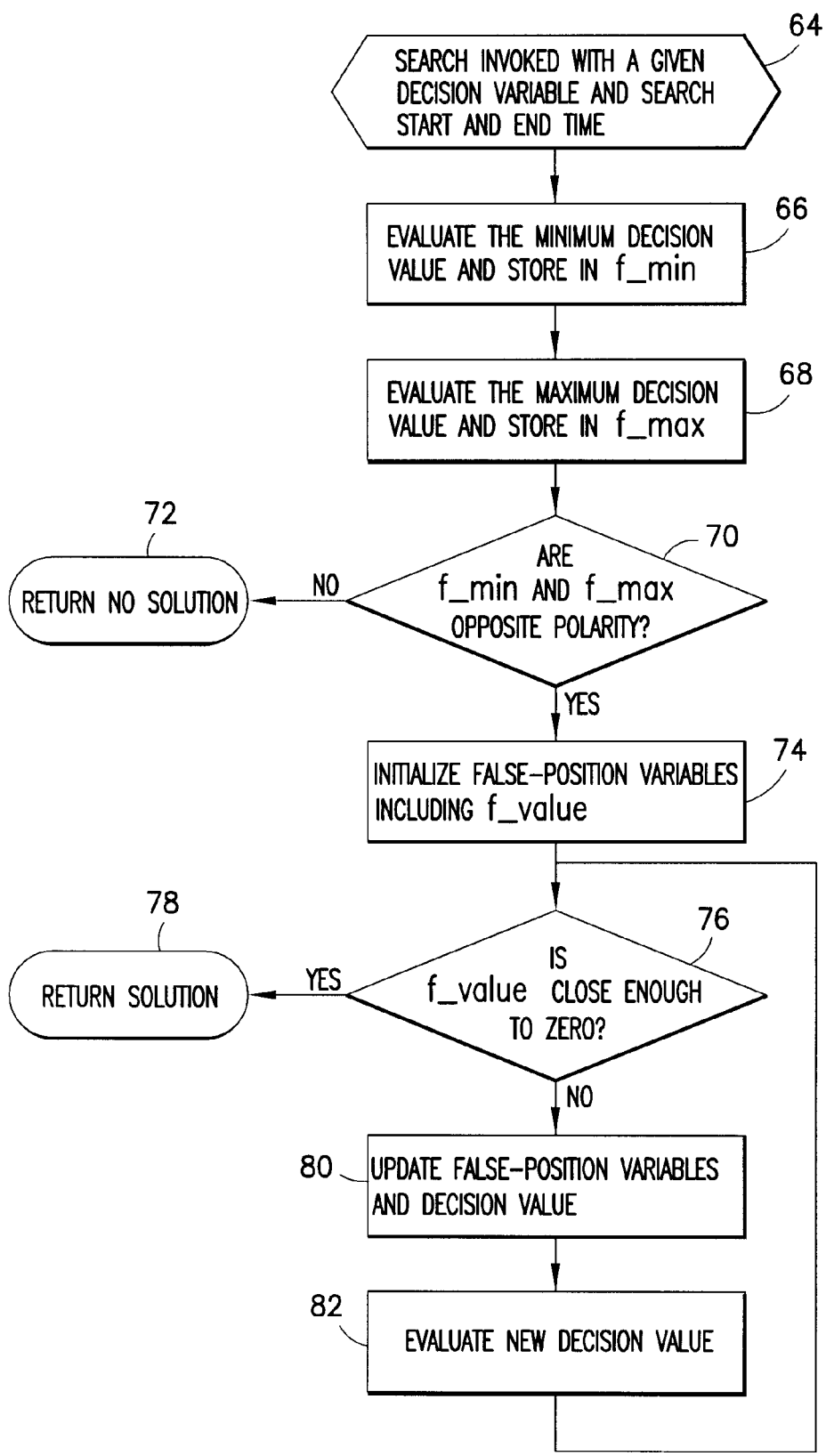
FIG. 7 is a process flow diagram showing the false-position search function.

FIG. 7 is a process flow diagram showing the false-position search function used for each of the searches 52, 54, 56 and 60 depicted in FIG. 3. The search function is invoked (step 64) with a given decision variable, a search start time and a search end time. The search start time and search end time bound the search frame for each search. In step 66, the decision value resulting from the input of the minimum value of the decision variable is evaluated and the resulting minimum decision value is stored in f_min. In step 68, the decision value resulting from the input of the maximum value of the decision variable is evaluated and the resulting maximum decision value is stored in f_max. The values f_min and f_max are the minimum and maximum values respectively of the function (CPA$_{min}$–S), where S is the desired miss distance. In decision block 70, a determination is made whether or not f_min and f_max have opposite polarities. If not, then the search is exited and a message is returned indicating that no solution exists (step 72). If f_min and f_max have opposite polarities, then step 74 initializes the false-position variables including f_value. Then in decision block 76, a determination is made whether or not f_value is sufficiently close to zero, i.e., whether f_value≤$\epsilon$, where $\epsilon$ is a configurable buffer value. If f_value≤$\epsilon$, then this solution to the root-finding problem is returned (step 78). If not, then the false-position variables are updated and a new decision value is set in step 80. Then the new decision value is evaluated in step 82. The search process then returns to decision block 76, which determines whether or not the new f_value is sufficiently close to zero. Steps 80, 82 and 76 are repeated until a solution is returned.

Figures 8, 8A, 8B:
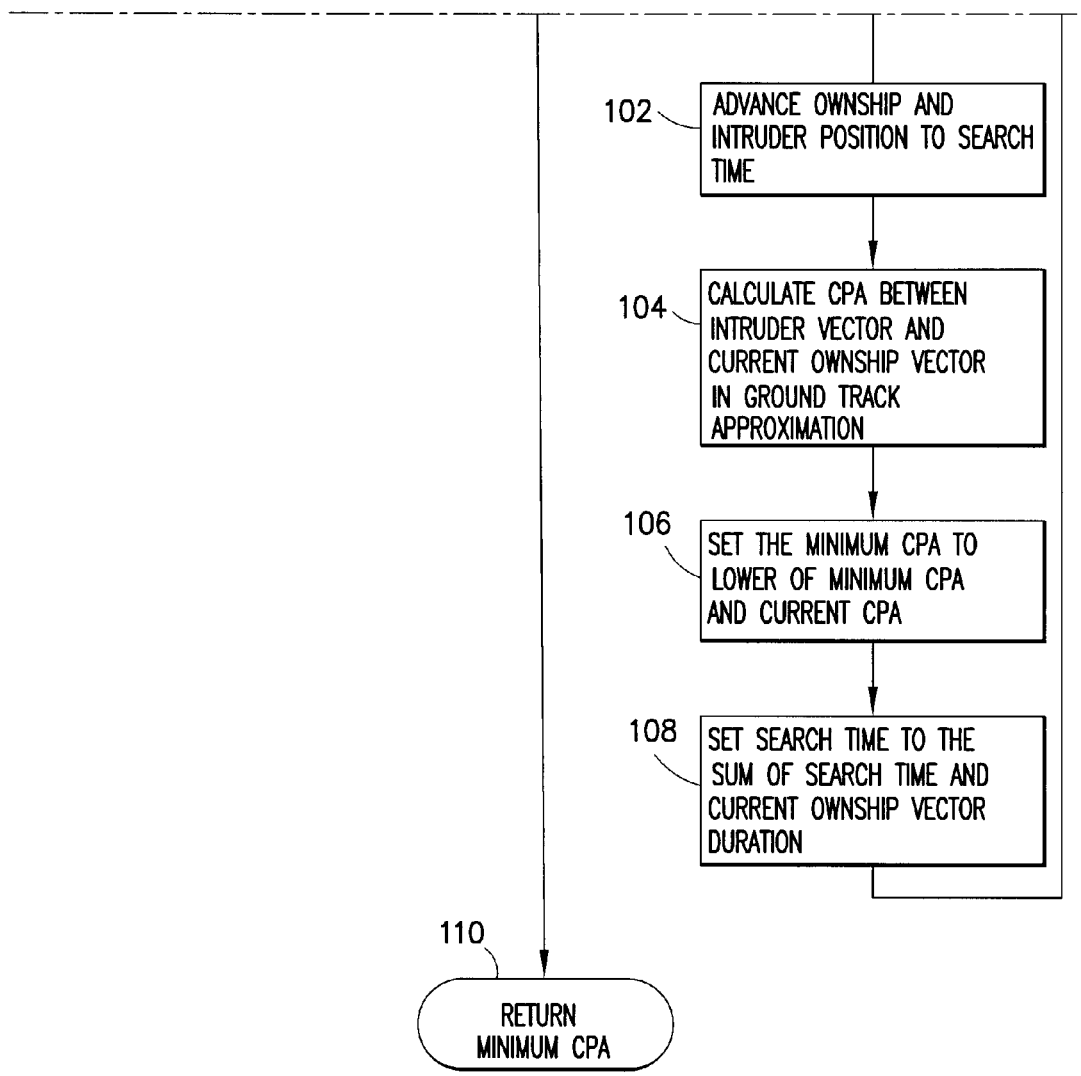
FIG. 8 is a process flow diagram showing the calculation of a single-value, minimum CPA.
Figure 8A:
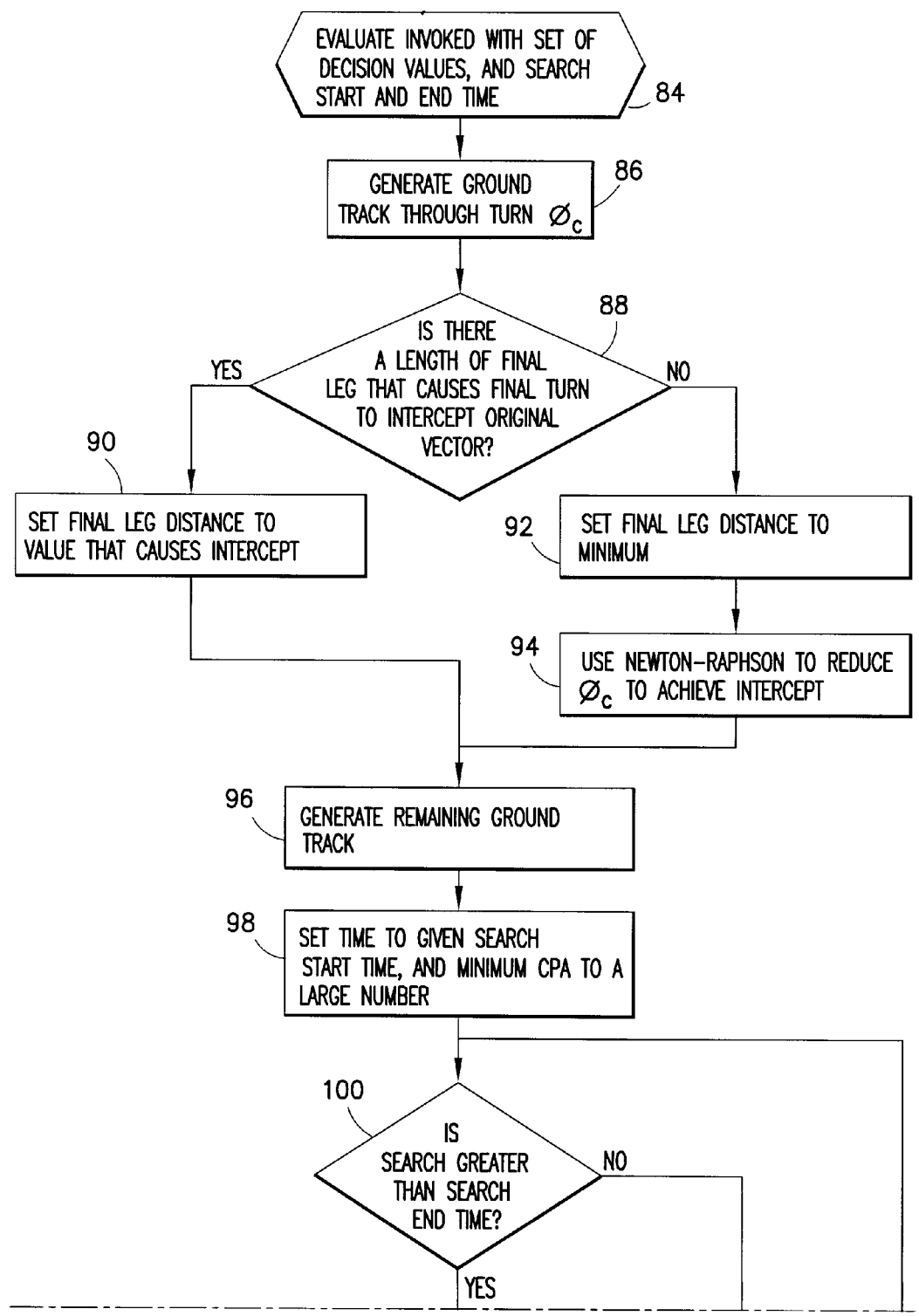

The term "false-position variables" refers to variables used only by the false-position search, which variables are known to persons skilled in the art. They include the decision variable and are listed below:

Input Variables
  val_max—this is the maximum value that will be passed into the function, where the function is shown in FIG. 8 (broken up into FIGS. 8A and 8B). If the search was for the first turn, this would be 90°.
  val_min—this is the minimum value that will be passed into the function. If the search was for the first turn, this would be 0°.
  max_iterations—the false-position method usually has two escapes (ways to terminate). The first is if the output of the function is close enough to zero; and the second is if a maximum number of tries has been exceeded. This variable is the maximum number of tries.
Local Variables
  iteration—each time the search iterates, this is incremented so one can see if the count has exceeded max_iterations. It is initialized to 0.
  val_right—the value used to bound the right side. It is initialized to val_max.
  val_left—the value used to bound the left side. It is initialized to val_min.
  val_decision—this is the holder that will have the value for the given decision variable, that causes the function to output approximately zero. This is the variable that is outputted by the false-position method. It can be initialized to 0.
  func_val_right—stores the function output caused by inputting val_right. It is initialized to function output caused by val_max.
  func_val_left—stores the function output caused by inputting val_left. It is initialized to function output caused by val_min.
  func_val_decision—stores the function output caused by inputting val_decision. It can be initialized to 0.
  side—the function has an input value where its input causes 0 to be outputted. The x-axis values to the right of the zero are called the right side, and the other values are called the left side. The false-position method keeps track of what side the current val_decision causes. This variable is initialized to 0, but after the first iteration, will either be +1 when on the right side, or –1 if on the left side.

FIG. 8 is a process flow diagram showing the calculation of a single-value, minimum CPA, which calculation is done each time one of the evaluation steps 66, 68 and 82 depicted in FIG. 7 is performed. The evaluation function is invoked (step 84) with a set of decision values, a search start time and a search end time. In step 86, a ground track is generated through the third turn $\theta_c$. Then in decision block 88, a determination is made whether or not a length of the final leg exists that will cause the final turn to intercept the original vector. This determination is made using Sections 1.1 and 1.2 of the Appendix. If such a length of the final leg exists, then that final leg distance is set to the value that causes the intercept in step 90. After step 90, the evaluation process proceeds to step 96, which generates the remaining ground track. If decision block 88 determines that no final leg length causes the final turn to intercept the original vector, then the final leg distance is set to the minimum value in step 92. Then the Newton-Raphson method is used (see Sections 1.1 and 1.3 in the Appendix) to reduce $\theta_c$ until the intercept with the original vector is achieved (step 94). After step 94, the remaining ground track is generated in step 96. Then in step 98, the time is set to the given search start time and the minimum CPA is set to a large number. In decision block 100, a determination is made whether or not the search time is greater than the search end time. If it is not greater, then the evaluation function proceeds to step 102, which advances the Ownship and Intruder positions to the search time. Then the CPA between the Intruder vector and the current Ownship vector in the ground track calculation is calculated (step 104 in FIG. 8). After the results of calculation 104 have been obtained, in step 106 the minimum CPA is set to the lower of the current minimum CPA and the current CPA. Then the search time is set to the sum of the search time and the duration of the current Ownship vector in step 108. The evaluation function then loops back to decision block 100, which again determines whether or not the search time is greater than the search end time. If the search time is not greater than the search end time, then steps 102, 104, 106, 108 and 100 are repeated in sequence. The CPA is calculated for each vector based on the heading of the current vector. If the search time becomes greater than the search end time, then the present value for the minimum CPA is returned in step 110.

The lateral maneuver model has been defined, the instructions to generate it have been listed, and a search process has been described that adjusts the maneuver to maximize the time until execution, minimize the deviation from path, and provide the desired miss distance.

The above-described system outputs a route change that will achieve a desired miss distance and return an unmanned aerial vehicle to its original path or trajectory, the route change being determined as a function of the following inputs: the desired miss distance, the desired bank angle, and state vectors for the unmanned aerial vehicle, the wind, and an intruder.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

APPENDIX

1, Path Finding Equations

Note all angles are in radians but degrees are shown for the reader's convenience.

1.1 Common Equations

The equations for motion with no linear acceleration or vertical (altitude) velocity are as follows:

$$x = x_0 + t*v_x + t*W_x \quad (1)$$

$$y = y_0 + t*v_y + t*W_y \quad (2)$$

$$h = r*\cos(w_0+180°) + t*W_y \quad (3)$$

$$k = r*\sin(w_0+180°) + t*W_y \quad (4)$$

$$x = h + r*\cos(w*t+w_0) + t*W_y \quad (5)$$

$$y = k + r*\sin(w*t+w_0) + t*W_x \quad (6)$$

$$x = h + d*\cos(c) + t*W_y \quad (7)$$

$$y = k + d*\sin(c) + t*W_x \quad (8)$$

$$w_0 = i - 90° \text{(left turn)} \quad (9)$$

$$w_0 = i + 90° \text{(right turn)} \quad (10)$$

where Eqs. (1) and (2) are for linear motion/extrapolation; and Eqs. (3)-(10) are for circular motion.

The equations for the wind triangle are as follows:

$$v_{xi} = v_{yg} + W_y \quad (11)$$

$$v_{yi} = V_{xg} + W_x \quad (12)$$

$$i = a\tan 2(v_{xi}, v_{yi}) \quad (13)$$

$$\text{inertial speed} = \text{sqrt}(v_{xi}*v_{xi} + v_{yi}*v_{yi}) \quad (14)$$

$$c = a\tan 2(v_{xg}, v_{yg}) \quad (15)$$

where $x_0$ is the initial x position; $y_0$ is the initial y position; $v_x$ is the x velocity component of Ownship; $v_y$ is the y velocity component of Ownship; $v_{xi}$ is the x inertial velocity component of Ownship; $v_{yi}$ is the y inertial velocity component of Ownship; $v_{xg}$ is the x ground velocity component of Ownship; $v_{yg}$ is the y ground velocity component of Ownship; $w_0$ is the initial angle, direction from center to circle start; w is the angular velocity; $W_x$ is the x velocity component of the wind; $W_y$ is the y velocity component of the wind; i is the inertial course; h is the circle center x value; k is the circle center y value; c is the ground direction of extrapolation (course); d is the distance of extrapolation; and t is time from either $w_0$ or $x_0$.

1.2 Intercepting a Target Vector in a Wind

The vector intercept is found by realizing the durations of the last two turns are preset and need not be calculated. When using the lateral maneuver, the direction after the last turn is correct—it is equal to the direction of the target vector. The only issue is that the final position may overshoot or undershoot the target vector. The value that needs to be found is the duration between turns. In general, not just when using the lateral maneuver, this equation works if the user assures the final direction equals the target. This also means that the vector before P does not need to be parallel to the target vector.

Figure 9:
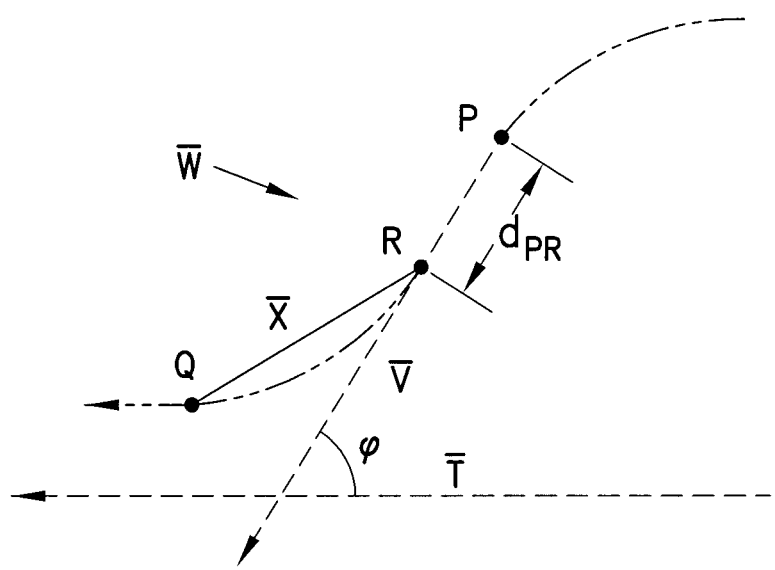
FIG. 9 is a drawing showing the components employed in the process for determining the ground distance between third and fourth turns that will result in the unmanned aerial vehicle intercepting the original vector.

The problem is illustrated in FIG. 9. The components are as follows: P—initial position; $\overline{V}$—ground velocity vector starting at P; $\overline{T}$—ground target vector; $\overline{W}$—wind vector; R—a point d distance from P on $\overline{V}$; Q—a point a fixed distance and direction from R; $\overline{X}$—the fixed vector from R to Q; $d_{PR}$—the ground distance between turns.

The solution is found by "sliding" R along $\overline{V}$ until point Q falls on $\overline{T}$. Again, Q is a fixed distance and direction from R, so R and Q have a "rigid" relationship. In general, the true path between R and Q is irrelevant and could consist of many turns and legs.

The problem is solved by first rotating and translating the components so the target vector is the x axis. Then we just need to find $d_{PR}$ where $y_Q$ equals zero. Since the solution is the ground distance, the winds are not needed to solve it, although the winds are needed to convert the ground vector $\overline{V}$ into an inertial vector. The problem statement is as follows: Given inputs: P, $\overline{V}$, $\overline{T}$, $\overline{W}$ and $\overline{X}$ or Q, find d.

The solution is as follows:

Rotate and translate the problem as shown in FIG. 9, such that the target vector is the x axis. The point of rotation can be any point on $\overline{T}$.

f=distance between R and Q
    1) $y_R = y_P + d_{PR}*\sin(\phi_V)$ Extrapolation P to R
    2) $y_Q = y_R + f*\sin(\phi_X)$ Extrapolation R to Q
    3) $y_Q = y_P + d_{PR}*\sin(\phi_V) + f*\sin(\phi_X)$ Plug 1 into 2
    4) $0 = y_P + d_{PR}*\sin(\phi_V) + f*\sin(\phi_X)$ Set $y_Q = 0$
    5)

$$d_{PR} = -\frac{[y_P + f*\sin(\varphi_x)]}{\sin(\varphi_v)}$$

Solve for $d_{PR}$

The value of $d_{PR}$ is not defined when $\overline{V}$ is 0° or 180°. This means when traveling parallel or anti-parallel to $\overline{T}$, adjusting $d_{PR}$ has no effect on the distance from Q to $\overline{T}$. With the lateral maneuver, the third turn will have some duration so $\overline{V}$ will not be parallel or anti-parallel to $\overline{T}$.

The value of $d_{PR}$ may be negative, which indicates R needed to be extrapolated backwards, or opposite to $\overline{V}$ ($\phi_v$+180°). This condition is considered "overshoot" and means the duration of the two turns is too great and, when $d_{PR}$ is zero, Q is below $\overline{T}$ (negative y region). See Section 1.3 in this Appendix to handle an overshoot.

1.3 Finding an Intercept with a Parallel Vector

Figure 10:
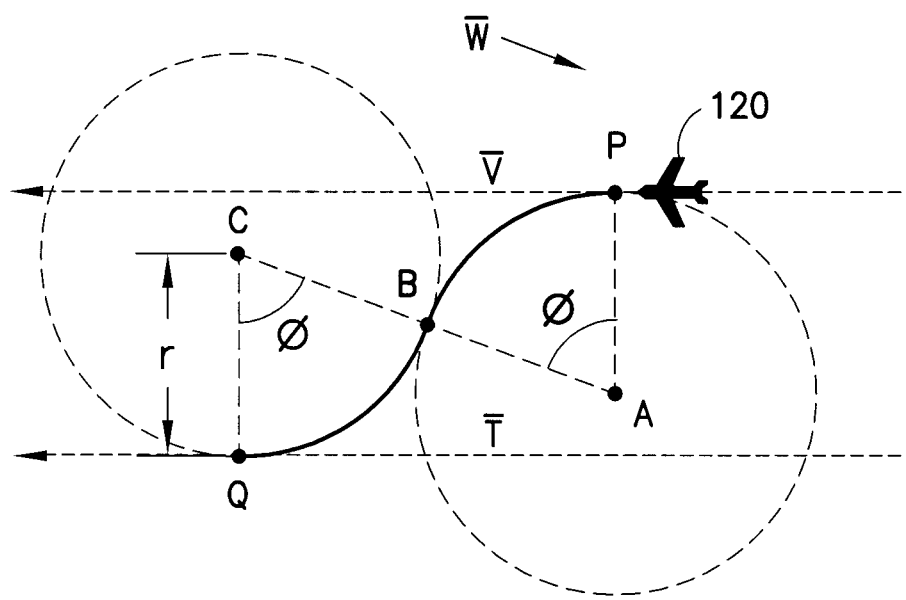
FIG. 10 is a drawing showing the components employed in the process for determining the duration of the third and fourth turns that will result in the unmanned aerial vehicle intercepting from the parallel vector to the original vector.

Intercepting a parallel vector in a wind is solved by finding the correct turn duration for two opposing turns. Since the target vector is parallel, the turns are equal duration and opposite. The problem is illustrated in FIG. 10. The components are as follows: P—initial position; $\overline{V}$—ground velocity vector starting at P; $\overline{T}$—ground target vector; $\overline{W}$—wind vector; r—the turn radius; A—center point of right-side turn; C—center point of left-side turn; B—midpoint between centers A and C; i—starting inertial course, calculated from $\overline{V}$ and $\overline{W}$; t—duration of a single turn; w—angular velocity.

The problem is solved by first rotating and translating the components so the target vector $\overline{T}$ is the x axis and the first turn is left. Then we just need to find the value of t that causes the y value of Q, $y_Q$, to equal zero, where t is the duration used for each turn, not the sum of durations. Therefore the duration from P to Q is 2 t.

It is assumed that no backwards motion is desired, so the maximum value of t is the time it takes the first turn to change the ground course by 90°. This limit is found, after the rotation, by finding the inertial course for a 270° ground vector, which is the normalized ground course of 180° plus 90°. The change in inertial course, c, is converted into a time limit s=c/w, where the angular velocity w is (inertial speed)/radius. The turn centers change with the angle because they are referenced to their respective inertial vector, so the wind vector is needed to solve the problem. Also the initial angle $w_0$ of the second turn is dependent on the first center point.

To solve the problem, the Newton-Raphson method is used. The Newton-Raphson method is disclosed in the Handbook of Mathematics by Bronshtein et al. (previously cited herein). The function f(t) is the y value of Q. The function is as follows: Given inputs P, $\vec{V}$, $\vec{T}$, $\vec{W}$, r; find s.

The solution is as follows:

Rotate and translate the problem as shown in FIG. 10, such that the target vector $\vec{T}$ is the x axis. The point of rotation can be any point on $\vec{T}$.

$w_{0A}=i_A+90°$
$k_A=r*\sin(w_{0A}+180°)+t*W_y$
$y_B=r*\sin(w_{0A}-w*t)+t*W_y$ Intermediate point
$w_{0C}=w_{0A}-w*t+180°$ Opposite first final angle
$k_C=r*\sin(w_{0C}+180°)+t*W_y$
$y_Q=k_C+r*\sin(w*t+w_{0C})+t*W_y$ The function to use is the last equation. The standard calculus-based derivative is then calculated and used with the Newton-Raphson method. The initial value of t is set to ½ the range of t.

The invention claimed is:

1. A flight control system comprising control logic for causing a first aerial vehicle to maneuver laterally to avoid a second aerial vehicle, said control logic comprising:
   first calculating means for calculating a time when a loss of separation between the first and second aerial vehicles will occur;
   second calculating means for calculating a start time and a trajectory of a lateral maneuver by which the first aerial vehicle could avoid the loss of separation, said start time preceding said predicted time; and
   means for outputting commands for controlling the first aerial vehicle to begin a first turn at said start time and then follow a flight path defined by said trajectory.

2. The system as recited in claim 1, wherein said second calculating means comprise means for calculating a minimum distance between said trajectory of the first aerial vehicle and a vector of the second aerial vehicle.

3. The system as recited in claim 1, wherein prior to said start time, the first aerial vehicle was flying along an original flight path defined by an original vector, said trajectory intercepting said original vector.

4. The system as recited in claim 3, wherein said trajectory of the first aerial vehicle further comprises a second turn later in time than said first turn, said first turn being in one direction and said second turn being in a direction opposite to said one direction, and said first and second turns having the same turn radius.

5. The system as recited in claim 4, wherein said second calculating means comprise means for calculating a closest point of approach of the first and second aerial vehicles for each of a multiplicity of different durations of said first turn, and means for determining which of said closest points of approach equals a desired miss distance.

6. The system as recited in claim 4, wherein said trajectory of the first aerial vehicle further comprises a straight leg that succeeds said first turn and precedes said second turn.

7. The system as recited in claim 6, wherein said second calculating means comprise means for calculating a closest point of approach of the first and second aerial vehicles for each of a multiplicity of different durations of said straight leg, and means for determining which of said closest points of approach equals a desired miss distance.

8. The system as recited in claim 4, wherein said second calculating means further comprise means for optimizing said calculated start time.

9. The system as recited in claim 8, wherein said trajectory of the first aerial vehicle further comprises a straight leg that succeeds said second turn and precedes a third turn, said straight leg being parallel to said original vector, and said second calculating means further comprise means for optimizing the duration of said straight leg.

10. The system as recited in claim 1, further comprising air-to-ground communications means for transmitting signals representing said start time and said trajectory of said lateral maneuver to a remote pilot and receiving an acceptance signal from the remote pilot, wherein said command outputting means outputs said commands for controlling the first aerial vehicle to begin said first turn at said start time and then follow a flight path defined by said trajectory only in response to receipt of said acceptance signal from the remote pilot.

11. A flight control system onboard an aerial vehicle, said flight control system comprising a computer programmed to perform the following steps:
   (a) calculating a predicted time when the distance separating said aerial vehicle and an intruder aerial vehicle will be equal to a desired miss distance, said calculating step using the current position and velocity of said aerial vehicle and said intruder aerial vehicle as variables;
   (b) calculating a start time and a trajectory of a lateral maneuver by which said aerial vehicle could avoid becoming separated from said intruder aerial vehicle by less than said desired miss distance, said start time preceding said predicted time; and
   (c) controlling said aerial vehicle to begin a first turn at said start time and then follow a flight path defined by said trajectory.

12. The system as recited in claim 11, wherein said step (b) comprises calculating a minimum distance between said trajectory of the first aerial vehicle and a vector of the second aerial vehicle.

13. The system as recited in claim 11, wherein prior to said start time, the first aerial vehicle was flying along an original flight path defined by an original vector, said trajectory intercepting said original vector.

14. The system as recited in claim 13, wherein said trajectory of the first aerial vehicle further comprises a second turn later in time than said first turn, said first turn being in one direction and said second turn being in a direction opposite to said one direction, and said first and second turns having the same turn radius.

15. The system as recited in claim 14, wherein said step (b) comprises calculating a closest point of approach of the first and second aerial vehicles for each of a multiplicity of different durations of said first turn, and determining which of said closest points of approach equals a desired miss distance.

16. The system as recited in claim 14, wherein said trajectory of the first aerial vehicle further comprises a straight leg that succeeds said first turn and precedes said second turn.

17. The system as recited in claim 16, wherein said step (b) comprises calculating a closest point of approach of the first and second aerial vehicles for each of a multiplicity of different durations of said straight leg, and determining which of said closest points of approach equals a desired miss distance.

18. The system as recited in claim 14, wherein said step (b) further comprises optimizing said calculated start time.

19. The system as recited in claim 18, wherein said trajectory of the first aerial vehicle further comprises a straight leg that succeeds said second turn and precedes a third turn, said straight leg being parallel to said original vector, and said step (b) further comprises optimizing the duration of said straight leg.

20. An unmanned aerial vehicle comprising the flight control system as recited in claim 11.

21. An unmanned aerial vehicle comprising a sense-and-avoid system that causes the unmanned aerial vehicle to perform a lateral maneuver in response to a predicted loss of separation in a horizontal plane between the unmanned aerial vehicle and an intruder aerial vehicle, wherein said sense-and-avoid system comprises a computer programmed to process a desired miss distance, a desired bank angle, and state vectors for the unmanned aerial vehicle, wind, and the intruder aerial vehicle; and then calculate a lateral route change which will achieve the desired miss distance and return the unmanned aerial vehicle back to a path parallel to an original vector of the unmanned aerial vehicle, said lateral route change being a function of at least said desired miss distance, said desired bank angle, and said state vectors for the unmanned aerial vehicle, wind, and the intruder aerial vehicle.

22. A method of re-routing an unmanned aerial vehicle that is being controlled by a remote pilot, comprising the following steps performed onboard the unmanned aerial vehicle:
   (a) calculating a time when a loss of separation between the unmanned aerial vehicles and an intruder aerial vehicle will occur;
   (b) calculating a start time and a trajectory of a lateral maneuver by which the unmanned aerial vehicle could avoid the predicted loss of separation, said start time preceding said predicted time;
   (c) generating a command for controlling the unmanned aerial vehicle to begin a first turn at said start time;
   (d) transmitting lateral maneuver information to the remote pilot after said command has been generated and prior to said start time; and
   (e) executing said command only if a signal indicating acceptance of the lateral maneuver is received from the remote pilot.

23. The method as recited in claim 22, wherein step (b) comprises the step of calculating a closest point of approach of the unmanned and intruder aerial vehicles for each of a multiplicity of different durations of said first turn, and determining which of said closest points of approach equals a desired miss distance.

24. The method as recited in claim 23, wherein said trajectory of the unmanned aerial vehicle further comprises a straight leg that follows said first turn, and step (b) further comprises the steps of calculating a closest point of approach of the first and second aerial vehicles for each of a multiplicity of different durations of said straight leg, and determining which of said closest points of approach equals a desired miss distance.

25. The method as recited in claim 22, wherein step (b) further comprises the step of optimizing said start time.

26. The method as recited in claim 22, wherein said trajectory of the first aerial vehicle further comprises a straight leg that succeeds said second turn and precedes a third turn, said straight leg being parallel to said original vector, and step (b) further comprises optimizing the duration of said straight leg.

27. The method as recited in claim 22, wherein step (b) comprises the following steps:
   processing a desired miss distance, a desired bank angle, and state vectors for the unmanned aerial vehicle, wind, and the intruder aerial vehicle; and
   calculating a lateral route change which will achieve the desired miss distance and return the unmanned aerial vehicle to a path parallel to the original path of the unmanned aerial vehicle.

* * * * *